United States Patent [19]

George

[11] Patent Number: 4,824,579
[45] Date of Patent: Apr. 25, 1989

[54] WATER CLARIFICATION METHOD AND APPARATUS

[76] Inventor: Albert L. George, P.O. Box 3604, Lafayette, La. 70502

[21] Appl. No.: 39,974

[22] Filed: Apr. 20, 1987

[51] Int. Cl.$^4$ ............................ C02F 1/24; C02F 1/40
[52] U.S. Cl. ..................................... 210/703; 210/712; 210/776; 210/744; 210/104; 210/115; 210/123; 210/221.2
[58] Field of Search ...................... 210/122, 96.1, 104, 210/115, 119, 123, 221.1, 221.2, 241, 522, 540, 704, 740, 744, 776, 923, 703, 712; 261/DIG. 75

[56] References Cited

U.S. PATENT DOCUMENTS

| | | | |
|---|---|---|---|
| 2,242,139 | 5/1941 | Munroe | 210/540 |
| 2,782,929 | 2/1957 | Colket | 210/540 |
| 3,529,728 | 9/1970 | Middelbeek et al. | 210/540 |
| 4,123,365 | 10/1978 | Middelbeek | 210/540 |
| 4,255,262 | 3/1981 | O'Cheskey et al. | 210/221.2 |
| 4,477,344 | 10/1984 | Olszewski et al. | 210/522 |
| 4,534,862 | 8/1985 | Zlokarnik | 210/221.2 |
| 4,564,457 | 1/1986 | Cairo, Jr. et al. | 210/221.2 |

Primary Examiner—Benoit Castel
Attorney, Agent, or Firm—Pravel, Gambrell, Hewitt, Kimball & Krieger

[57] ABSTRACT

A primary separation vessel is separated into a plurality of chambers having fluid communication therethrough; in each of the chambers there is further included a downwardly depending eductor system having a coaxial bore wherein fluid induces air into the eductor system where the educted air in the fluid being projected downward into the flow of fluid and the bubbles rising along the curved wall of the tank and carrying contaminants through a centrally located collection trough, which through gravity the contaminants collect in the trough and move to a circulation collected in the trough. The contaminants then move via gravity to a separation zone within the vessel, wherein the oil that is collected is allowed to spill over in an oil collection zone for recovery, and the level of the water is monitored to draw off any water collected within the zone. There is further provided means within the vessel for allowing the initial introduction of fluid through the vessel to release a certain quantity of the oil within the initial fluid, so that a portion of the oil entrained in the fluid is removed from the fluid as it enters the vessel. Of the fluid flowing through the vessel as it undergoes cleaning through the gas eduction system, a portion is recycled back through the vessel to be educted into the flow of fluid, a portion is used to create two phase fluid flow, and a portion is recovered exterior to the vessel.

20 Claims, 5 Drawing Sheets

WATER CLARIFICATION METHOD AND APPARATUS

BACKGROUND OF THE INVENTION

1. Field of the Invention

The system of the present invention relates to water clarification. More particularly, the system of the present invention relates to a method which incorporates a floatation vessel for separating, in particular, water and oil, in a manner such that the oil is floated to the surface of the water, and is allowed to channel out to be returned to storage, and the water is cycled through the vessel for clarification.

2. General Background

In the oil and gas industry, there is a continuing problem of the by-products of the oil and gas recovery process, wherein water produced in the process is contaminated with suspended oil and solids. In an oil and gas producing platform, water that is produced in the recovery of hydrocarbons from the well is usually contaminated with suspended oil and suspended solids, and can not be disposed of in the surrounding water, due to the stringent EPA requirements for disposing of products from the oil and gas recovery process.

The present state of the art utilizes a device which mixes and disburses gas in the form of fine bubbles in a body of liquid in a tank for attempting to remove contaminants from flowing water. This apparatus is covered by U.S. Pat. No. 4,255,262, issued to U.S. Filter Corporation, and employs a gas eduction system from the upper section of the respective tanks downward via a draft tube to the liquid body contained within the tank. Gas eduction occurs in a given portion of the liquid portion already contained when the vessel is recirculated back to the individual cells or compartments with a centrifugal pump. The apparatus also utilizes a mechanical skimmer assembly, electrically driven, which serves to remove the impurity laden froth from the surface of the liquid in the tank. Such skimmers are moderate to high maintenance components of a separation system particularly in corrosive environments in the oil producing and chemical plant industries.

U.S. Pat. No. 4,564,457, assigned to L'eau Claire Systems, Inc., teaches the use of a floatation cell system, wherein the fluid entrained with the gas is circulated into a plurality of baffled chambers, from the bottom of the tank, and as it rises upward, oil is collected onto the bubbles. There is situated a centrally located trough at the top of the vessel, so that as the water level of the vessel is raised, the froth in the top portion of the vessel collects into the trough, and the contaminants contained within the froth are then siphoned from the vessel.

Other patents issued in the art ar as follows:

| Patent No: | Issued to: |
| --- | --- |
| 2,274,658 | R. B. Booth |
| 2,782,929 | W. W. Colket |
| 3,468,421 | B. S. Hazel, et al |
| 1,648,558 | J. R. Mesten, et al |
| 1,612,557 | E. C. Wiseburger |
| 911,314 | H. F. Maryville |
| 2,825,422 | O. B. Showenfeld |
| 4,305,819 | Kobozev, et al |
| 2,942,733 | H. A. Thompson |
| 2,179,131 | R. B. Miller |
| 4,102,787 | A. A. Gersten |

-continued

| Patent No: | Issued to: |
| --- | --- |
| 4,147,629 | A. A. Gersten |
| 4,111,806 | Wright, et al |

SUMMARY OF THE PRESENT INVENTION

The system of the present invention provides a cylindrical separation vessel, divided into a plurality of chambers, having fluid communication therethrough; in each of the chambers there is further included a downwardly depending eductor system having a coaxial bore wherein fluid induces gas into the system wherein the resulting two phase flow is projected downward and outward into the flow of fluid where the bubbles rise along the curved wall of the tank and carry contaminants to the surface and to a centrally located collection trough, where the contaminant laden froth and surface water are cascaded into the trough. The contaminants and some water then move via gravity to a separation zone within the vessel, wherein the oil that is collected is allowed to spill over into an oil collection zone for recovery, and the oil-water interface is monitored and any water collected within the zone is returned to the floatation process for retreatment. There is further provided means within the vessel for allowing the initial introduction of fluid through the vessel to release the free oil within the initial fluid, so that a portion of the oil entrained in the fluid is removed from the fluid as it enters the vessel. A portion of the fluid flowing through the vessel as it undergoes cleaning through the gas eduction system is recycled back through the vessel to be educted into the flow of fluid, and a portion is recovered exterior to the vessel.

Therefore, it is a primary object of the present invention to provide an oil/water separation vessel wherein the contaminants are collected in the top portion of the vessel and allowed to flow to a separation zone within the vessel;

It is a further object of the present invention to provide an oil/water separation vessel, by inducing a flow of gas and liquid through a primary flow of fluid through the vessel as the primary flow moves through the vessel so that any oil entrained within the fluid is carried to the surface of the fluid within the vessel via the gas bubble flow;

It is still a further object of the present invention to provide an oil/water separation vessel which can recirculate a predetermined quantity of clarified water through the vessel during the cleaning of the fluid flow therethrough;

It is still a further object of the present invention to provide an oil/water separation vessel system, which would enable the user of the system to disconnect a particular eduction portion of the system, and yet not interrupt the primary operation of the entire system;

It is still a further object of the present invention to provide an oil/water separation vessel system by continuously collecting the contaminants in the fluid flow from the top portion of the fluid, and allowing the contaminants to move to an oil/water separation zone within the vessel, so that the portion of oil collected from the vessel may be recovered and possibly reused;

It is still a further object of the present invention to provide visual access to the vessel through small pressure-tight hatches rather than through the large elongated doors required to service conventional paddle assemblies;

It is still a further object of the present invention to provide a free-oil skimmer for incoming contaminated fluid;

It is still a further object of the present invention to provide contaminant-laden froth skimming without paddles;

It is still a further object of the present invention to remove excess water from skimming, sending water back through the unit for retreatment and concentrated oil from froth is recovered and sent to storage or back to the system;

It is still a further object of the present invention to provide removal of water from a secondary separator by fluid eduction to mininize abrasion damage common to pumps in like service;

It is still a further object of the present invention to provide means to dilute incoming contaminated fluid with bypassed pressurized treated fluid;

It is still a further object of the present invention to modulate fluid flow and air/gas flow through eductors to control 2-phase flow density and velocity;

It is still a further object of the present invention to provide a removable eductor that could be removed from outside the vessel without interruption of other cells; and It is still a further object of the present invention to provide a mechanical skimmer means for operation pneumatically, hydraulically, or eletro-mechanically.

DETAILED DESCRIPTION OF THE PREFERRED EMBODIMENT

Figure 1:
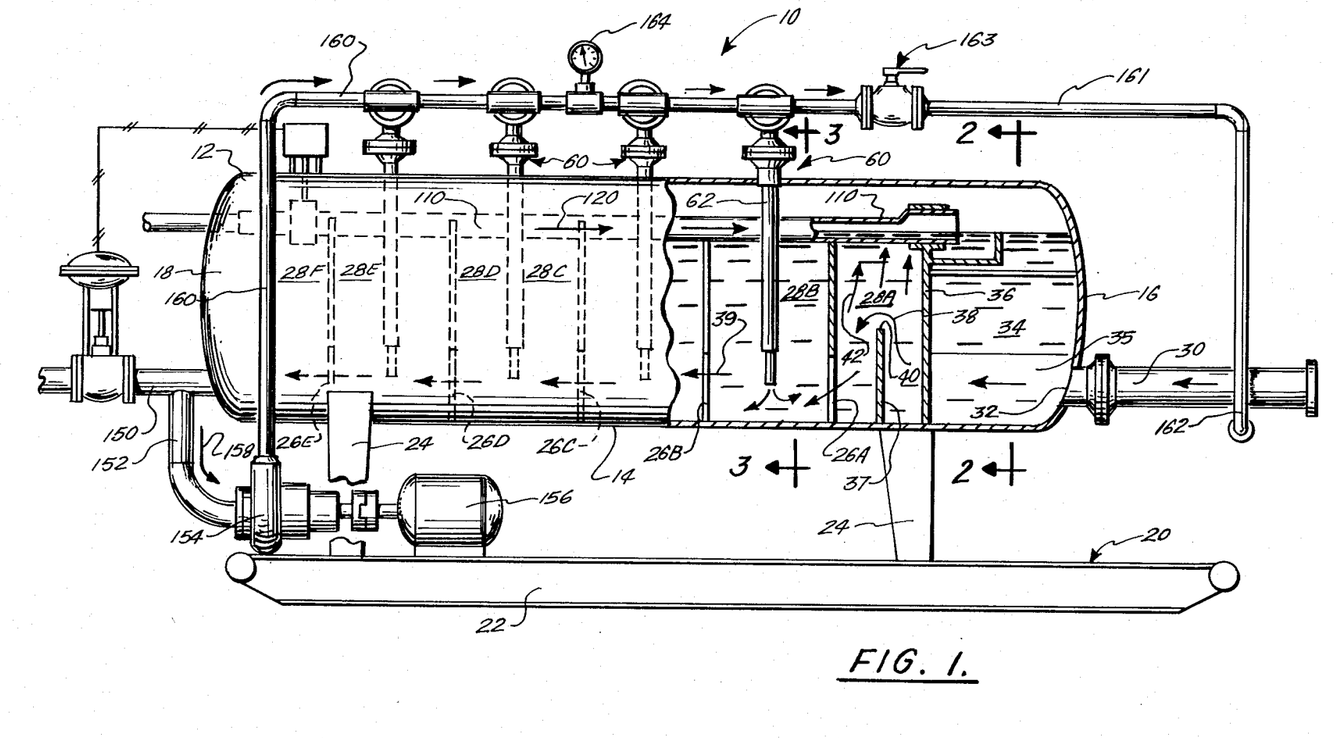
FIG. 1 is an overall side, partially cut-away view of the system of the present invention.

FIGS. 1-6 illustrate the preferred embodiment of the system of the present invention by the numeral 10. As seen in the FIGURES, overall, system 10 would relate to a system water clarification through the use of a principal floatation cell or vessel 12 wherein the contaminants are removed from the water in a collection zone in the upper portion of the cell and the oil is allowed to interface with the water collected within the collection zone and to be returned to a storage bin for reuse. As seen in the FIGURES, particularly in FIG. 1, there is provided a principal floatation cell or vessel 12 which is generally cylindrical in shape, having an annular side wall portion 14 with a first end portion 16 and a second end portion 18, the annular wall portion 14 and end portion 16 and 18 defining a means for flowing contaminated water therethrough and removing the contaminants from the water through a floatation process for further collection. As seen in FIG. 1, floatation cell 12 is mounted on a skid means 20, which comprises a base portion 22 and a plurality of leg members 24 supporting floatation cell 12 a distance above base 22 as seen in FIG. 1. Further, floatation cell 12 would comprise a plurality of internal baffle members 26A-26E spaced along its length, defining a plurality of secondary internal floatation cells 28A through 28F along the length of the chamber 12, the function of which will be discussed further.

As seen in FIG. 1, floatation cells 12 is provided with a principal fluid inlet 30 for allowing the flow of untreated water into the cell at entrance point 32. A fluid flow through entrance point 32 would enter the oil/water collection zone 34 wherein there is provided a flow channel 35 (see also FIG. 2) for the entering fluid to bypass collection zone 34 and enter free oil removal cell 28A. A baffle 36 separates collection zone 34 from cell 28A. Upon entering cell 28A, the fluid flow, indicated by Arrow 38, slows down due to the larger flow path and encounters partial baffle 37 which directs the flow up and then down around top portion 40 of partial baffle 37. In doing so, any free oil which may be in the fluid at this point, since it tends to be lighter than the water, would tend to flow up in the direction of Arrows 42 to be collected at the surface in a manner which will be described further. Further, fluid flow introduced into the cell would flow past partial baffle 37 and would encounter a full baffle member 26A which, in this case is an upright vertical member, as seen in the side view in FIG. 1, and which separates cell 28A from 28B. Baffles 26A-26E are is secured along the complete side wall 14 of cell 12, and would continue up to substantially the greater portion of the circumference of the circular shape of vessel 12 as seen in FIG. 3, to a point 46. Fluid flow past baffles 26A-26E would flow through a lower flow zone 48 (FIG. 3), as defined by a portion of the baffle 26A-26E being cut away so that fluid flow may be maintained through flow zone 48 to the remaining floatation cells within vessel 12. As seen in FIG. 1, there are provided a plurality of baffles, namely 26B, 26C, 26D and 26E, which are structured identically to baffle 26A, and providing a centrally located lower flow zone 48 therethrough for allowing continuous flow of the water, yet providing removal of contaminants as the water flows therethrough during the process. The openings in baffles 26A-26E defining lower flow zone 48 may be relocated above the bottom centrally located flow zone to the lower right then lower left quadrant of circular baffles alternately to provide a longer, more torturous, serpentine path of flow to avoid channeling and to expose the contaminated flow stream to maximum two phase contact with bubbles.

Reference is now made to the FIGURES for a more detailed explanation of the eduction process that takes place in each of the secondary floatation cells 28A-28F within the floatation vessel 12. Making reference more particularly to floatation cell 28B, which is defined as that space between baffle 26A and baffle 26B, wherein fluid flow is moving therthrough, it should be noted that water which is flowing beyond baffle 26A has released a certain amount of oil upward as was discussed earlier, and the suspended oil remaining must now be removed from the water flow through vessel 12.

Figures 4, 4A, 5:
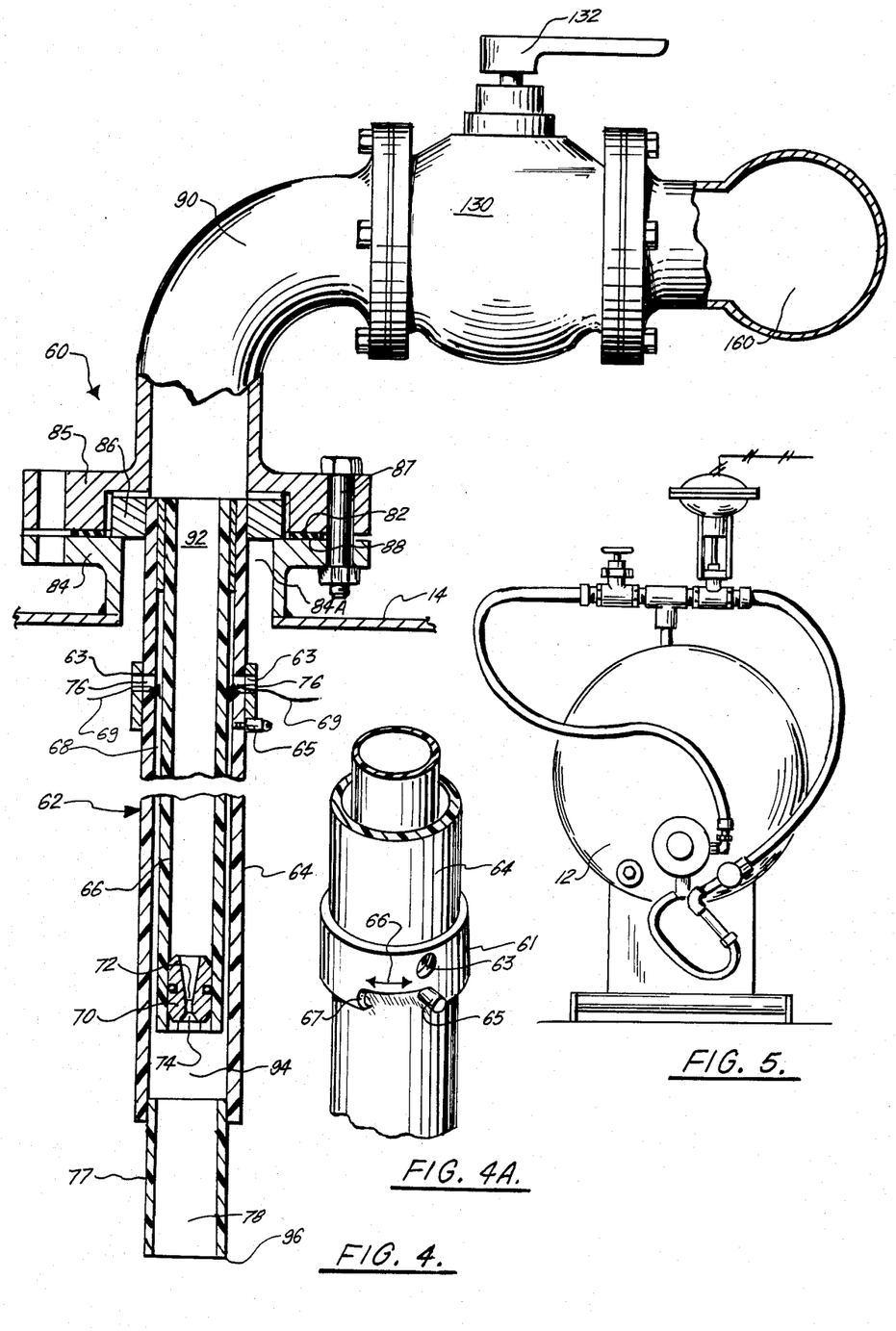
FIG. 4 is a detailed view of the eductor nozzle assembly in the system of the present invention.
FIG. 4A is a detail of the eductor means of the present invention.
FIG. 5 is an end view of the clarification vessel in the system of the present invention.

This is achieved in the following manner. As seen in the FIGURES, each floatation cell 28A-28F is provided with eduction means 60 positioned within, in this case, floatation cell 28B. Eduction means 60 would comprise a downward depending flow pipe 62 which as seen in FIG. 4 would comprise an exterior tube 64, housing an interior tube 66, with the interior tube 66 having an outer diameter less than the inner diameter of exterior tube 64, so that an annular space 68 is defined there between. Interior tube 66 would be further provided with a removable orifice member 70, having a conically shaped flow bore 72 therethrough so that any fluid flowing through nozzle 70 would move through the conically shaped flow bore 72 to increase its velocity at exit point 74 of orifice 70. There is further provided a lower discharge tube 77 which is positioned on the end of exterior tube 64, to discharge the two phase flow of fluids through flow bore 78, as will be described more fully.

For purposes of mounting, it should be noted, as seen in FIG. 4, that the tube members 64 and 66 are mounted via a companion flange connection 82, which provides a lower flange member 84 securely mounted onto the outer surface of wall 14 of vessel 12, and having a bore 84A therethrough for accommodating the tubes 62 and 66 mounted therewithin via ring collar 86. There is provided an upper companion flange 85; the upper flange 85 and lower flange 84 being boltingly secured to one another via bolts 87, so that a fluid tight seal is provided therebetween. As shown, there may be provided further a gasket member 88 between the surfaces of flange 84 and 85 to provide an airtight seal.

In operation, companion flanges 84 and 85 would receive pressurized clean water flow via flow pipe 90, which would flow downward into interior tube 66, which is centrally mounted to receive flow therefrom through flow bore 92. Outer tube 64 is provided with one or more air ports 76, which are located within the gas containing portion 105 (see FIG. 3) of cell. As this fluid flow is directed downward through flow bore 92, and is forced through nozzle 70, at a higher velocity, a vacuum is created within annular space 68 and air flow or gas is siphoned from the gas portion 105 (as seen by Arrows 69), into annular space 68 to enter a mixing zone or chamber 94 at that region which is defined as the region below the lowermost end point of inner tube 66 and the uppermost point of discharge tube 77. Following the joining of the air and the water flow from that point, the two phase fluid flow is discharged from end portion 96 of discharge tube 77 into vessel 12.

As seen in FIG. 3, Arrows 100 represent the discharging of fluid from discharge tube 77. As seen in FIG. 3, following the discharge of fluid, which is fluid comprising a two phase mixture of liquid and air bubbles, the fluid is then, after making initial contact with the inner surface 15 of wall 14 within vessel 12, diverted into the direction of Arrows 17 within vessel 12, and would move upward through the lateral fluid flow which is simultaneously moving through vessel 12 as was explained earlier. This upward flow of bubbles would tend to collect part of the oil suspended in the fluid flow within this particular floatation cell, and the bubbles would tend to form a froth 102 at the top portion 104 of vessel 12; froth 102 would be collected in the manner to be described further.

FIG. 4A shows a means by which the amount of air that can be introduced into annular channel 68 through ports 76 is controlled during the eduction process. This means would include, as seen in FIG. 4A, an annular collar member 61 fitted around external tube 64 and having a port 63 which would align with port 76 in tube 64. Collar member 61 rests upon a stop 65 which is positioned in an elongated channel 67 in the wall of collar member 61, so that collar member 61 may be rotated in the direction of Arrow 66 so that port 63 may be fully aligned, partially aligned or completely misaligned with port 76. Therefore, the position in which collar member 61 is affixed to outer tube 64 would central the quantity of air which would be allowed to be educted through port 76 into annular channel 68 for mixture in the mixing chamber 94.

For point of clarification, the manner in which the flow of fluid as indicated by Arrows 17 being redirected along the outer wall of vessel 12, would tend to form a collection zone or apex at level 104, defines means for moving the entrained oil contained in lateral water flow into the collection zone 104 at the top of vessel 12. As seen in FIG. 1, in the preferred embodiment, there would be situated within each of floatation cells 28B, 28C, 28D and 28E, downwardly depending eduction means 60, so that as the fluid travels in the direction of Arrow 39 as seen in FIG. 1, laterally through the length of the vessel 12, an air/water mixture is educted therethrough for providing the means for moving the entrained oil contained in the lateral flow upwardly into the collection zone 104 at the top portion of vessel 12. Therefore, it is to be understood that as the oil-laden water is moved across and through vessel 12, as it reaches the floatation cells at the end portion 18 of vessel 12, the water would necessarily become more clarified and at the point of exiting vessel 12 would be for the most part substantially clarified for safe disposal.

Figure 6:
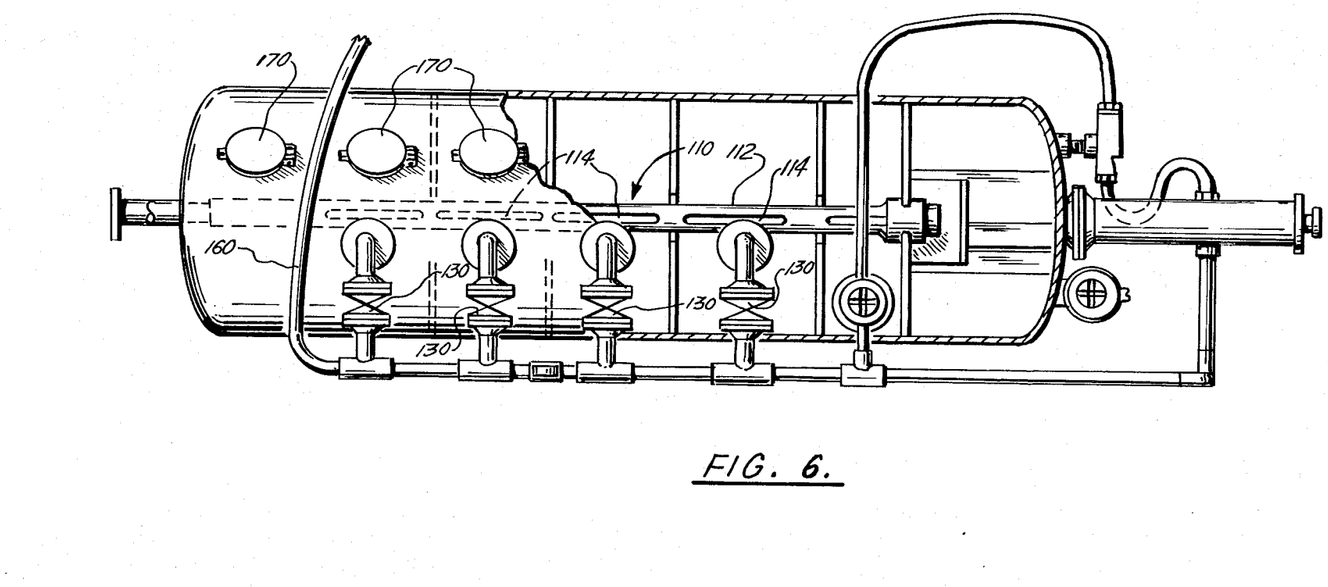
FIG. 6 is a top, partially cut-away view of the clarification vessel in the assembly of the system of the present invention.

Reference is now made to the FIGURES for a detailed explanation of the means of collecting the froth 102 that has collected at the top 104 of the surface of the water contained within vessel 12 during the process. As seen in the FIGURES, particularly in FIG. 6, there is provided a longitudinally placed cylindrical collection channel 110, which can be described as a cascade skimmer, channel 110 having a continuous side wall 112, which is positioned substantially within the depth of the water contained in the vessel as seen in FIG. 3. However the uppermost portion of channel 110 as seen particularly in top view in FIG. 6, is provided with a series of openings 114 on its uppermost surface, so that access may be had to the internal flow bore 116 (FIGS. 2 and 3) within skimmer 110. Therefore, as the the level of the froth would increase at zone 104, the froth would tend to spill over into openings 114 and would be collected within flow bore 116 as seen in the level 118 in FIG. 3. Due to the fact that skimmer 110 is closed to flow on end portion 18 and flow bore 116 is open on end portion 16, gravity flow would occur within skimmer 110, so that any froth collected within flow bore 116 would tend to flow in the direction of Arrow 120 for further collection. Since the froth that is being collected in the collection zone 104 is made up of bubbles wherein there is entrained oil, the fluid being cascaded into skimmer 110 would for the most part be water heavily laden with oil that has been floated from the water flow during the process up to the point of skimmer 110.

Figure 2:
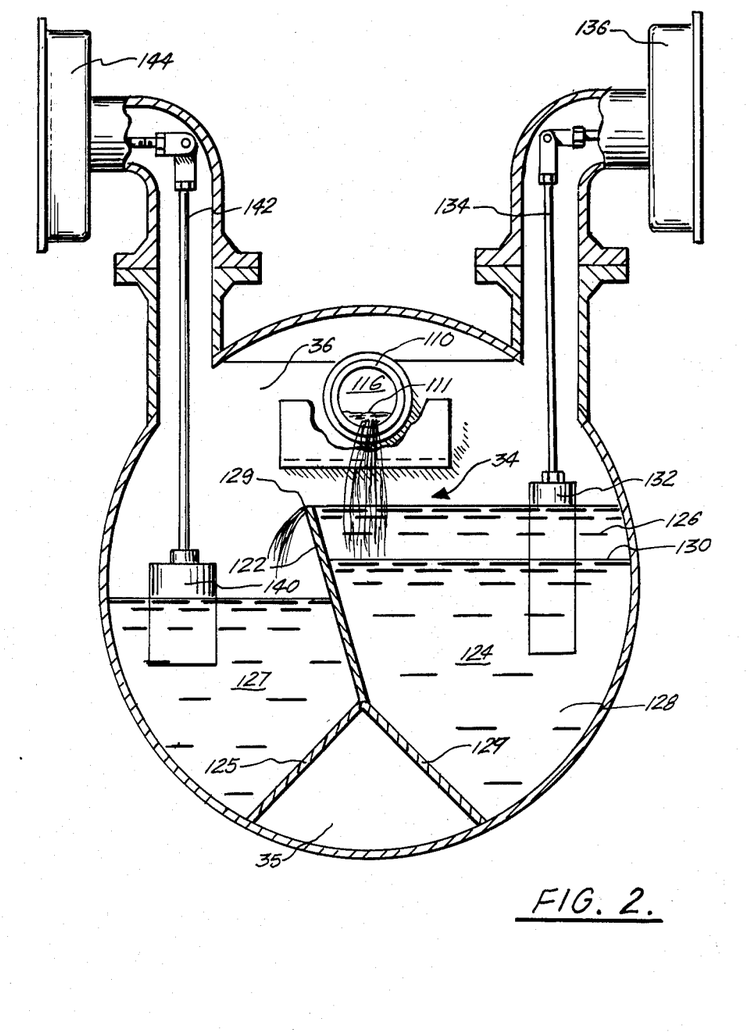
FIG. 2 is an end view along lines 2—2 in FIG. 1 of the clarification vessel of the system of the present invention.
Figure 3:
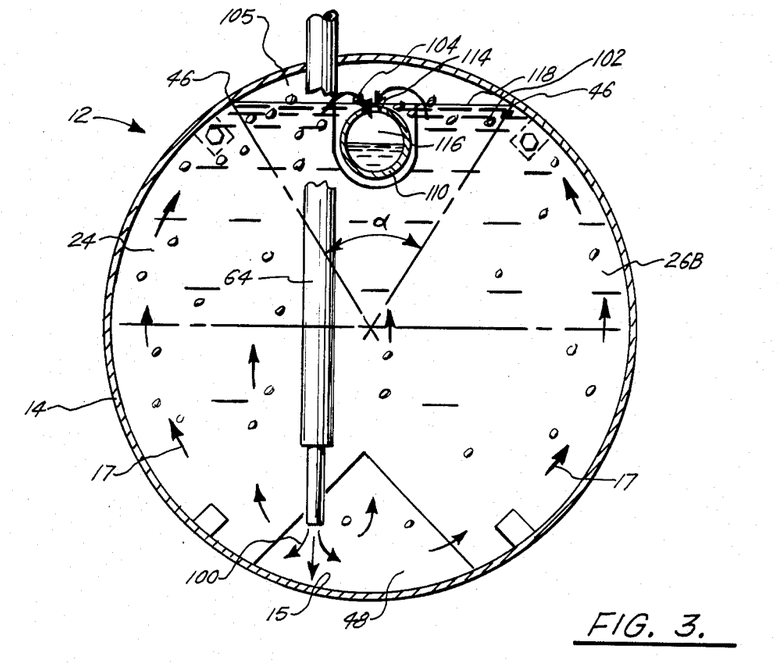
FIG. 3 is an end cross-sectional view along lines 3—3 in FIG. 1 of the clarification vessel of the system of the present invention.

Reference is now made to FIG. 2, which indicates the manner in which the oil-laden water contained within flow bore 116 is collected in the process. In FIG. 1 in side view, it was noted that the initial flow of water through flow pipe 30 continued to flow past the initial baffle 36 and was segregated from collection zone 34 until it made contact with cell 28A as seen in FIG. 1. Zone 34, which is the space between the initial baffle 36 and end portion 16 of vessel 12, could be defined as a means for receiving and collecting the contaminated oil-laden water that is collected within cascade skimmer 110, for separation and removal. Contained within collection zone 34 is an angulated weir 122 which separates the primary collection zone 34 into a first collection zone 124 and a second oil collection zone 127. Weir 122 rests upon plates 125 and 129 which are positioned to form channel 35 to allow inflow from pipe 30 as seen in FIG. 1.

As seen in FIG. 2, as the oil-laden fluid 111 is allowed to flow out of cascade skimmer 110, it is directed via weir 122 to first collection zone 124 which would therefore house a quantity of a mixture of oil and water as it flowed into zone 124. However, due to the properties of oil and water, the oil would form an upper layer 126 due to its specific gravity being less than that of water, and the water would form a lower layer 128 within first zone 124 forming an interface 130 therebetween. As seen in FIG. 2, there is provided a float member 132 at the end of a rod 134 which would activate a pump controller 136. Therefore, as the water layer 128 reaches a certain level within zone 124, the movement of float member 132 to the up position would activate pump controller 136 in order to pump the water from the collection zone 124. As seen in FIG. 2, since the level of oil 126 would reach the top portion 129 of weir 122, a spillage of the oil would occur over the top portion 129 into the second collection zone 127, wherein theoretically a concentration of dewatered oil would be collected therewithin. Again, there would be provided a second float member 140 containing a rod 142 to activate a pump controller 144 so that once the oil reached a certain level within zone 127 a second pump would be activated to drain the oil from collection zone 127 to be retrieved for storage or reuse. Therefore, as the system was ongoing, the level of water within zone 124 and the level of oil within zone 127 would be constantly regulated so that no interruptions in the process would take place.

Figure 2A:
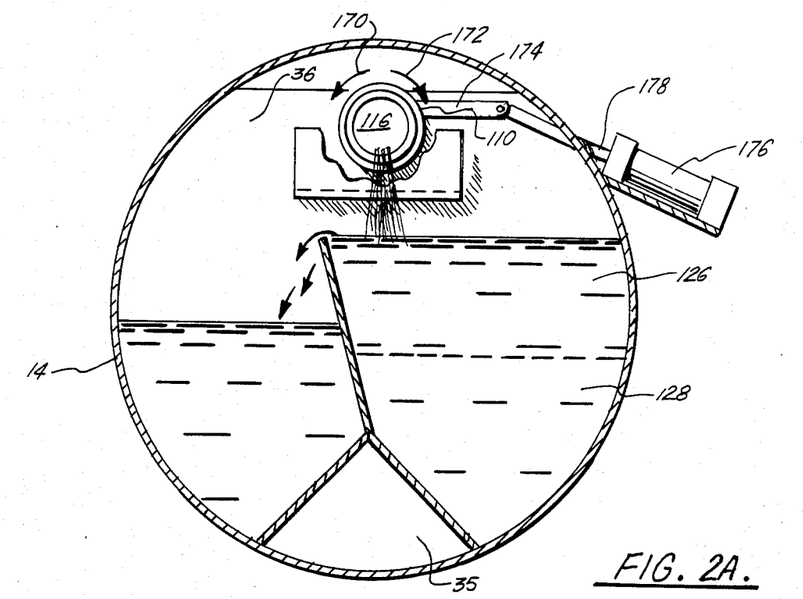
FIG. 2A is an end view of the clarification vessel of the system of the present invention illustrating a modified skimmer assembly.

Further, FIG. 2A represents a cross-sectional view of an additional embodiment of skimmer 110 which is provided with a means for rocking skimmer 110 in the direction of Arrows 170 and 172. This means includes an arm member 174 attached to the outer wall of skimmer 110 and hingedly engaged to a hydraulic cylinder or the like 176, so that forward and rearward motion of piston arm 178 of hydraulic cylinder 176 would impart rocking motion to skimmer 110. Therefore, as froth would be collecting on the upper portion of skimmer 110 as seen in FIG. 2A, the rocking motion of skimmer 110 would enable the froth to be collected more readily within the bore 116 of skimmer 110, and therefore accomplish a more efficient collection of the froth.

For purposes of understanding the flow of the fluids within the system, it should be noted again that fluid is pumped through entry line 30 and flows through the entire vessel 12 in the direction of Arrows 39. As the eduction of fluid and air is taking place via line 62, the water of course becomes less and less contaminated. After it reaches the final cell 28F, the water then moves out of exit pipe 150 (FIG. 1) to be, for the most part, dumped overboard.

However, there is further provided a second exit line 152 (FIG. 1) wherein a pump 154 would draw a certain quantity of the water flow out of line 150. This pump 154 would be powered via a standard motor 156. The flow of water through line 152 in the direction of Arrow 158 would provide a source of pressurized water into line 160 which would flow into each eduction unit 62 means 60 as seen in FIG. 1 so that a constant source of water is provided to the eduction means within the system. As is seen in FIG. 1, there is further provided a pressure gauge 164 for monitoring the pressure within the eduction units in the system. For purposes of flow, the amount of fluid which would not be flowing into each eduction pipe 62 would flow to a further continuation 161 of line 160 to be reintroduced into line 30 at point 162 for dilution of incoming flow of contaminated water.

For purposes of efficiency of the system, in FIG. 6 there are noted a plurality of pressure hatches 170 which are utilized so that entry can be made into the various floatation zones for cleaning of vessel 12 or the like. Likewise, in each eduction pipe 62 companion flange connection 82 is provided with a valve member 130 (FIG. 4) which can be moved to the open and closed position during the process, so that should one eduction unit be inoperable, a valve handle member 132 is simply placed in the closed position and flow within pipe 160 is allowed to continue to the other eduction units, and the particular eduction unit not in use may be removed and worked upon without interruption of the system and the process. The removal of flow pipe 90, by removing bolts from its two end flanges, exposes and releases the upper end of eductor pipe 62 which can now be lifted vertically upward out of the unit. Valve 163 (FIG. 1) controls the amount of recirculated clarified water which enters line 161 thereby effecting header pressure 164 (FIG. 1) and metered flow to the eductor pipes 62.

Because many varying and different embodiments may be made within the scope of the inventive concept herein taught, and because many modifications may be made in the embodiments herein detailed in accordance with the description requirement of the law, it is to be understood that the details herein are to be interpreted as illustrative and not in a limiting sense.

What is claimed as invention is:

1. A process for clarifying a contaminated fluid stream, comprising the following steps:
   a. providing a primary vessel;
   b. separating the primary vessel into a plurality of fluid clarification chambers;
   c. introducing a primary stream of contaminated fluid into a first end of the vessel;
   d. providing a flow of fluid containing entrained gas through the contaminated stream within at least a portion of the clarification chambers;
   e. allowing the gas entrained within the fluid to flow to the surface of the contaminated stream and carry contaminants therewith;
   f. collecting the contaminants at a central collection zone at the top portion of the vessel;
   g. flowing the collected contaminants out of the collection zone in a collection trough; and
   h. separating water collected in the collection trough from contaminants collected in the collection trough.

2. The process of claim 1, wherein the vessel is separated into a lower contaminated fluid flow zone and an upper contaminants collection zone.

3. The process of claim 1, wherein the primary vessel is separated into a plurality of clarification zones by a series of vertically disposed baffles.

4. The process of claim 1, wherein the flow of fluid with the entrained gas further comprises a downwardly depending flow pipe, having a first external pipe, a second pipe coaxially aligned therein, with an annular flow space therebetween, so that gas is educted through the annular space to mix with fluid flow through the internal pipe.

5. The process of claim 4, wherein the flow of gas and fluid within the downwardly depending flow pipe comprises a two phase flow entering the vessel to establish a return flow of the entrained gas in the direction following the curvature of the wall of the vessel up to the apex of the collection zone.

6. The process of claim 1, wherein cascading surface water continuously removes collected contaminants from the fluid surface.

7. The process of claim 1, wherein excess water separated from consolidated contaminants is re-treated in the system.

8. An apparatus for removing oil and other contaminants from a water stream, the apparatus comprising:
   a. a primary vessel comprising a flow line for introducing a water stream into the vessel and a flow line for allowing the water stream to exit the vessel;
   b. a plurality of internal baffles separating the vessel into a plurality of decontamination zones;
   c. a flow space within the vessel for allowing the water stream to flow from a first end of the vessel to a second end of the vessel;
   d. an eduction means contained within each decontamination zone for emitting an aerated stream of fluid into the water stream, the eduction means comprising:
      i. an external flow pipe;
      ii. an internal flow pipe coaxially aligned within the external pipe, the internal pipe having an external diameter less than the interior diameter of the external pipe for defining an annular air flow space therebetween;
      iii. an accelerating means contained within the internal flow pipe for accelerating the flow of fluid therein; and
      iv. means for directing a fluid flow through the internal pipe into a mixing chamber in the external pipe, wherein gas educted into the fluid establishes an aerated flow into each decontamination zone;
   e. means for allowing any of the eduction means to be removed from the vessel without interrupting operation of the other eduction means;
   f. collection means within a contaminant collection zone, the collectionmeans comprising an elongated channel so that contaminants carried to the contaminant collection zone will flow within the channel and be removed from the vessel; and
   g. means for separating oil in the collection zone from water in the collection zone.

9. The apparatus in claim 8 wherein the eduction means further comprises means for returning a portion of the water flowing out of the vessel into the vessel for serving as fluid flow within the eduction means.

10. The apparatus in claim 8, wherein the fluid chamber of the primary vessel is an airtight pressurized vessel.

11. The apparatus in claim 8, wherein the elongated channel comprises means for directing water and oil to one portion of the vessel.

12. The apparatus in claim 8, wherein the accelerating means further comprises a nozzle member having a conically shaped fluid flow port therethrough for accelerating fluid as the fluid flows therethrough.

13. The apparatus in claim 8, further comprising a means to rotate the elongated channel to facilitate collection of contaminants within the collection zone.

14. A system for separating oil from a water stream contaminated with oil, the system comprising:
   a. a primary vessel comprising an inflow line for introducing a contaminated water stream into the vessel, and an outflow line for allowing the water stream to exit the vessel;
   b. a plurality of internal baffle members separating the vessel into a plurality of floatation cells;
   c. a fluid flow space in each of the baffles for allowing lateral fluid flow from a first end of the vessel to a second end of a vessel;
   d. eduction means contained within each of the floatation cells for educting a fluid/air stream into the lateral fluid flow in a direction perpendicular to the lateral fluid flow to collect oil entrained within the fluid flow and direct the collected oil to an upper collection zone within the cell;
   e. collection means positioned within the collection zone of the cell, for receiving oil contained within the water stream and directing the collected oil to a collection compartment within the vessel; and
   f. means contained within the vessel for separating oil collected in the collection means from water collected in the collection means, and for drawing off a portion of the oil as the oil reaches a certain level within the collection compartment.

15. The system in claim 14, wherein the eduction means comprises a downwardly depending tube allowing fluid flow therethrough, and means for siphoning air into the fluid flow for creating an aerated fluid/air flow into the lateral fluid flow within the vessel.

16. The system in claim 14, further comprising means for blocking fluid flow through one or more of the eduction means while allowing the other eduction means to be maintained in operation.

17. The system in claim 14, wherein the means for receiving the oil is a horizontally disposed cylindrical tube with a longitudinal skimmer opening in its side wall at the top thereof.

18. The system in claim 17, wherein the cylindrical tube is pivotally mounted for adjustment of the skimmer opening relative to fluid level.

19. The system in claim 17, wherein means are provided for movement of the cylindrical tube in oscillating rotary movement to enhance skimming of contaminants.

20. The system in claim 14, further comprising means for allowing one or more eduction means to be vertically removed from the vessel while allowing the other eduction means to continue operation.

* * * * *